Aug. 28, 1934.      F. C. FRANK      1,971,604
WHEEL
Filed Feb. 11, 1929      2 Sheets-Sheet 1
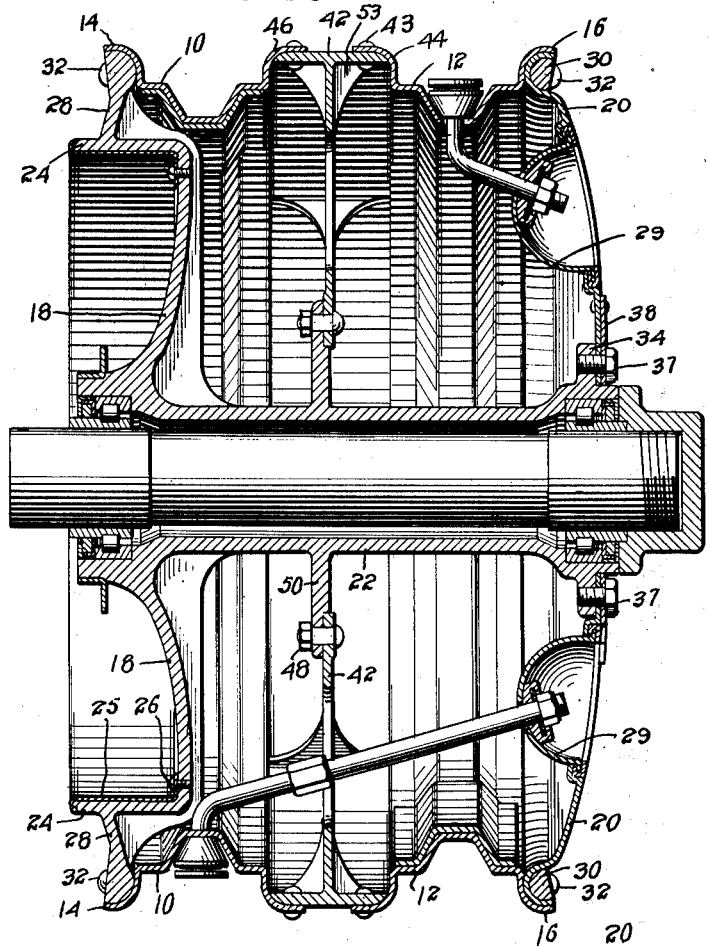
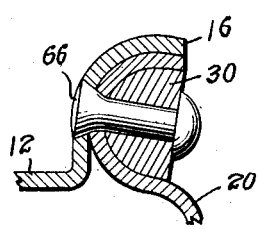
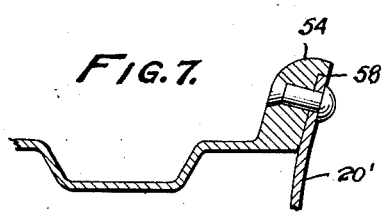
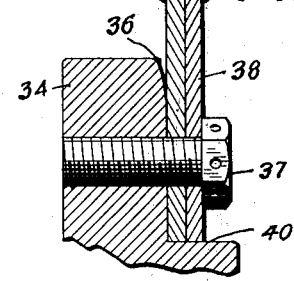
INVENTOR
F. C. FRANK
BY
ATTORNEYS Aug. 28, 1934.　　　　F. C. FRANK　　　　1,971,604
WHEEL
Filed Feb. 11, 1929　　2 Sheets-Sheet 2

INVENTOR
F. C. FRANK
BY Semmes & Semmes
ATTORNEYS

Patented Aug. 28, 1934

1,971,604

UNITED STATES PATENT OFFICE 1,971,604

WHEEL

Frederick C. Frank, South Bend, Ind., assignor to Bendix Brake Company, South Bend, Ind., a corporation of Illinois Application February 11, 1929, Serial No. 339,106

7 Claims. (Cl. 301—36)

This invention relates to wheels and is illustrated as embodied in a heavy duty aeroplane wheel of the double disk type adapted to support two tires.

One important feature of novelty relates to a novel wheel body construction comprising two spaced apart disks, supporting, at their respective peripheries, the outer edges of two rims, the inner edges of said rims being both spaced apart and supported by a central strengthening and supporting disk secured thereto. A rigid and compact dual tired wheel structure is thus presented eminently adapted for the rigorous demands of bus, truck and aeroplane service.

Various other features of novelty relate to a novel disk and hub connection wherein the hub flange is tapered to provide clearance for the disk body member to permit the latter to flex under side thrust without crystallization and fracture; to a novel combination of rim and disk wherein the rim is provided with a relatively thick tire bead flange and rabbeted to accommodate the peripheral portion of the cooperating disk; to a rim and disk connection embodying particular countersink outlines accommodating novel rivet fastenings to avoid fracture of the latter; and to various other features of novelty and desirable particular constructions and combinations of parts which will become apparent from the following description taken in conjunction with the accompanying drawings, in which:

Figure 1 is a vertical sectional view taken through my novel wheel structure;

Figure 2 discloses, in side elevation, the central support disk of Figure 1;

Figure 3 is a fragmentary sectional view indicating the hub and outer disk connection shown in Figure 1;

Figure 4:
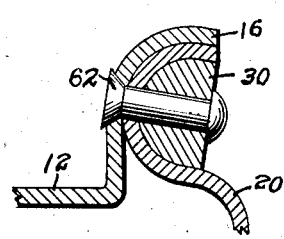
Figure 4 shows in detail one conventional form of rim and disk connection.
Figure 5:
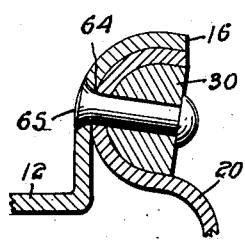

Figures 5 and 6, similar to Figure 4, show modified forms of the rim and disk connection; and Figure 7 discloses a modified form of rim and disk construction.

As disclosed in Figure 1, my novel dual rim wheel comprises two "drop center" rims 10 and 12, the outermost tire bead flanges 14 and 16 of which are preferably outwardly curved to accommodate the correspondingly curved peripheries of inner and outer wheel body members 18 and 20 respectively. Inner body member 18 is preferably cast integral with a hub member 22 and may consist of a brake drum 24, provided with a hardened steel liner 26, secured to the head flange of the drum as by the screws 26', and an outwardly extending and inwardly inclined flange 28, the latter preferably cast integral with the drum flange. Flange 28 may be enlarged at one end and is preferably outwardly inclined on its outer face and rounded on its inner face to nest within the tire flange as previously described. The outer disk body member 20 is preferably crowned or outwardly convex and may be provided with hemispherical recesses 29 to receive the tire inflating means, which structure is fully disclosed and claimed in my co-pending application No. 254,644, filed Feb. 16, 1928. A ring member 30 is preferably nested within the curved disk and rim flanges at the outer side of the wheel and fastenings 32 secure both body parts to their respective rims.

One feature of my invention resides in a novel connection between the outer disk 20 and hub flange 34, the latter being preferably cast integral with the hub and drum structure. All wheels and particularly aeroplane wheels are subjected to excessive side thrust, making necessary a certain flexing or lateral movement of the disk or other body members with respect to the axle mounting. This movement may result in crystallization and ultimate fracture of the wheel parts and to obviate this I propose, as disclosed in Figure 3, to inwardly taper or round off the hub flange at 36, thus providing a recess or clearance to permit the flexing of the disk 20, which may be detachably or otherwise secured as by bolts 37 to the flange. The disk is preferably also provided, in contiguous relation thereto, with a reinforcing ring 38 of substantial diameter, both of which members are supported on the shouldered portion 40 of the hub. The reinforcing disk or ring 38, extending as it does a substantial distance up the side of the disk body member, also functions to reinforce the structure and obviate fracture under side thrust.

Figure 2:
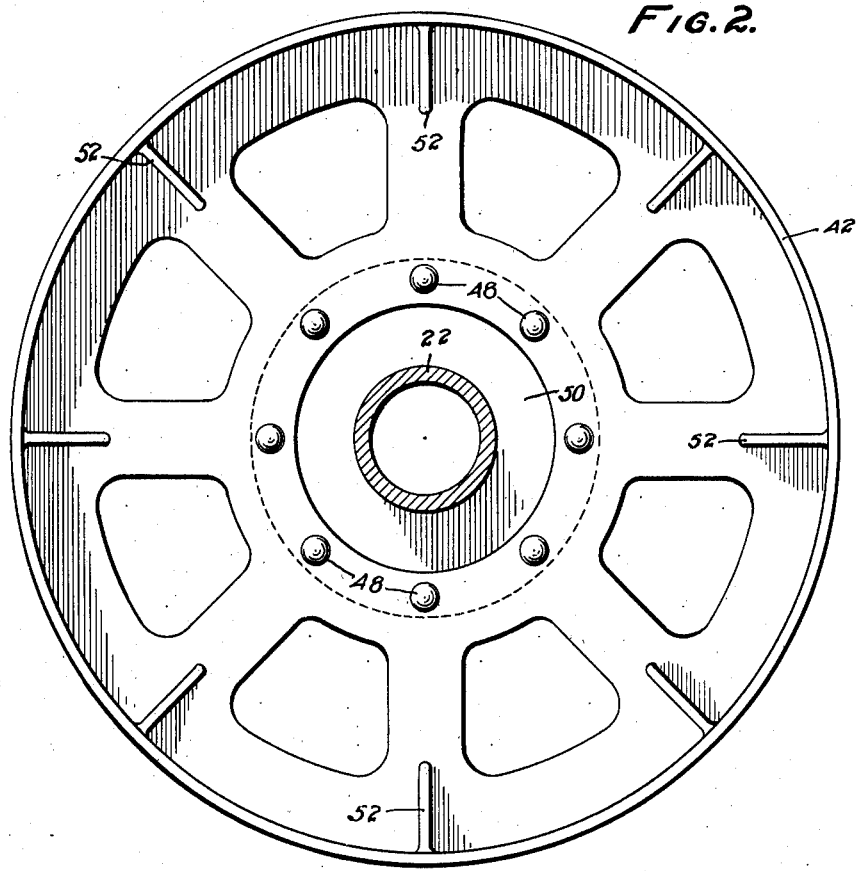

The most important feature of my invention lies in the provision of a compact and rigid wheel structure for the use of two rims and to this end I provide a novel arrangement wherein a central disk member 42, shown in detail in Figure 2, is provided with a T-sectioned periphery, the edges of the laterally extending arms thereof being secured, as by rivets 43, to the inner rim flanges 44 and 46 of rims 12 and 10 respectively. Disk 42 is preferably, though not necessarily, detachably secured as by bolts 48, to a flange 50, the latter preferably cast integral with the hub, and the disk may also be provided with reinforcing webs 52 at its periphery and spaced openings intermediate its inner and outer peripheries, the latter to lighten the disk. A rigid wheel structure is thus presented, the rims being fully supported by the several disks and also suitably spaced by the central reinforcing disk.

In lieu of the outer rim and disk structure of Figure 1, I may provide, as disclosed in Figure 7, a rim having an abnormally thick tire bead flange 54, which may be curved on its inner face and rabbeted at 58 on its outer face to accommodate the periphery of the outer disk 20'.

As disclosed in Figures 5 and 6, I have illustrated still another feature of my invention wherein there is provided novel fastening means for the rim and disk. There is disclosed in Figure 4 the conventional rivet characterized by a relatively short tapered or countersunk head 62 initially flat on its outer surface. This necessitates machining the head to the contour of the curved rim flange after the parts are fastened. Furthermore with this type of rivet there may occur a shearing off of the head at the base of the taper which is at the junction of the rim and disk. During riveting there oftentimes is sufficient stress between the rim and disk to cause an incipient indentation at this point, which forms a focus for fatigue stresses to ultimately cause a rupture of the rivet at the base of the head.

The above objectionable features I propose to obviate by providing the rivet of Figure 5 with a fillet 64 of fairly large radius and initially rounding the head 65 to conform to the rim flange contour. The rim and disk are countersunk to a shape to correspond to the particular shaped rivet and with this construction that portion of the rivet at the juncture is materially increased, thus increasing its sheer strength. Furthermore the initial rounding of the rivet head obviates the machining of the conventional rivet as previously described.

As a second alternative I may, as disclosed in Figure 6, provide the head 6⁶ of the rivet with a relatively long taper of low pitch with respect to the body of the rivet, so that the head is carried substantially through with disk and rim, the long head increasing the strength of the fastening at the critical point referred to.

While several embodiments of my invention have been disclosed and described in detail, it is not my intention to limit myself thereto but only so far as may be defined by the scope of the appended claims.

I claim:

1. A vehicle wheel sub-assembly unit comprising two identically-formed flanged rims spaced apart by a T-sectioned disk member, the laterally extending portions of said member being secured to the inner flanges of said rims.

2. A wheel comprising a hub provided with a brake drum at one end, a central flange, and a shoulder on the other end, a T-sectioned annular member secured to said central flange, an end disc secured to said shoulder, and a pair of tire rims secured between said brake drum and T-section member and between said T-sectioned member and end disc respectively.

3. A wheel comprising a hub member provided with an internal brake drum at one end having an outwardly extending central drum flange, an intermediate flange on said hub member and an end shoulder, a T-section annular member secured to said intermediate flange, and an end disc secured to said shoulder, and a pair of rims secured on either side of said T-member and extending to the end disc and drum flange respectively.

4. A wheel comprising a hub member having a plurality of flanges of increasing diameter from one end to the other, a disc member adapted to be secured to an intermediate flange having a central aperture sufficient to permit the same to be passed readily over any smaller end flanges and a pair of rim members secured on either side of said disc member, one of said rim members being secured directly to the flange of greatest diameter, and the other being secured to the smallest flange through a second disc member.

5. A vehicle wheel comprising two spaced disk body members connected by a common hub member and supporting respectively at their peripheries the remote edges of two rim members, the adjacent edges of said rim members being spaced apart and supported by a central T-section disk having reinforcing webs, the latter being permanently secured to the edges of said rims and detachably secured to a flange on the hub.

6. A vehicle wheel sub-assembly unit comprising two flanged rims spaced apart by a T-sectioned disk member, transverse webs connecting the laterally extending portions of the member to the body of the member, the laterally extending portions of said member being secured to the adjacent flanges of said rims.

7. A wheel comprising a hub, spaced disks supported thereby a plurality of identical rims flanged secured to the disks by their flanges a central disk member secured to the hub, a peripheral flange on the central disk having its edges secured to the adjacent flanged edges of the rims and reinforcing webs connecting the central disk and the flange.

FREDERICK C. FRANK.